April 27, 1943.  C. F. KRAMER  2,317,619
HEAD LAMP
Filed May 10, 1941  2 Sheets-Sheet 1

Clarence F. Kramer
INVENTOR.

BY E. C. McRae and
Robert L. Harris
ATTORNEYS.

WITNESS.
William Tilly

April 27, 1943.  C. F. KRAMER  2,317,619
HEAD LAMP
Filed May 10, 1941  2 Sheets-Sheet 2
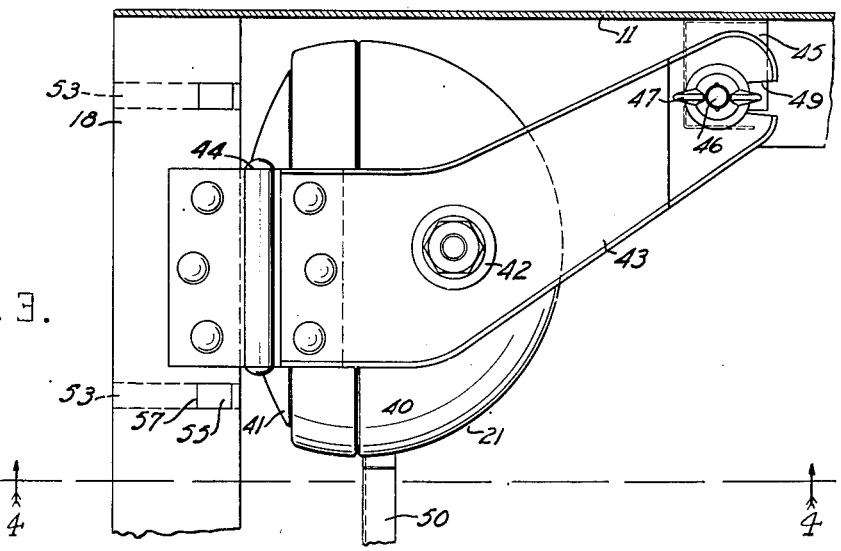
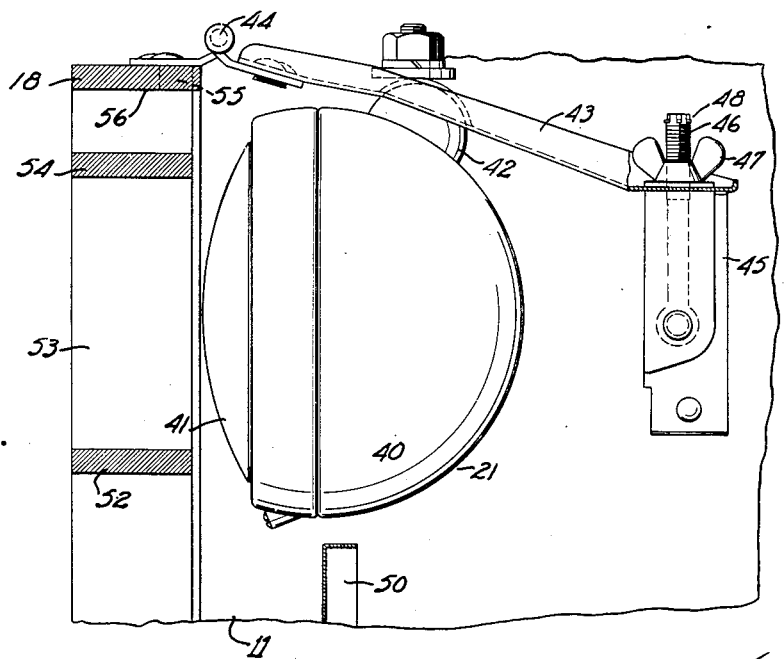

Patented Apr. 27, 1943

2,317,619

UNITED STATES PATENT OFFICE 2,317,619

HEAD LAMP

Clarence F. Kramer, Birmingham, Mich., assignor to Ford Motor Company, Dearborn, Mich., a corporation of Delaware Application May 10, 1941, Serial No. 392,831

2 Claims. (Cl. 180—1)

This invention concerns motor vehicles and more particularly a head lamp structure to be used on such vehicles.

An object of this invention is to provide a head lamp construction such as may be disposed behind a protective shield; and yet be readily accessible for repair and adjustment, as well as serving as a trouble light in the event that work is to be done on the motor of the vehicle.

As an example of this invention, I show it in use on a reconnaissance car, which is the type of vehicle used in military service. This car is extremely light, is equipped with a four-wheel drive, and is designed to be operated over rough terrain. As combat units, these cars are subjected to extreme and arduous service and must be expected to operate at the highest possible speed. Inasmuch as these cars may be operated through underbrush, or other obstruction, it is necessary to provide protection at the front for the radiator structure, the headlights and such other portions of the vehicle's accessories as might be damaged thereby.

To accomplish this, a brush screen formed of spaced metallic bars is provided which covers substantially the entire frontal area of the car and protects the radiator and the lights. However, it is apparent that when necessary to replace the light bulb of such a lamp or otherwise adjust it, if conventional construction were used, either the entire brush screen or the lamp would have to be removed. The former course would require considerable labor and expenditure of time, besides preventing the use of the screen as an integral portion of the body structure. If the lamp is removed, time is consumed and in addition it will require refocusing and adjustment.

To avoid this and permit the brush screen to be permanently attached, I have devised a mounting for the head lamp which permits such replacement or alteration to be made quickly without interference by the brush screen or changing of focus of the lamps. Moreover, this mounting is so constructed that when desired the head lamps may be trained on the motor of the motor vehicle to facilitate the making of repairs or adjustment of the motor.

With these and other objects in view, my invention consists in the arrangement, construction and combination of the various parts of my improved device, described in the specification, claimed in my claims, and illustrated in the accompanying drawings in which:

Figure 3 is a plan view on an enlarged scale of the head lamp and its mounting.

Figure 4 is an elevation of the head lamp and mounting taken on the line 4—4 of Figure 3.

Figure 1:
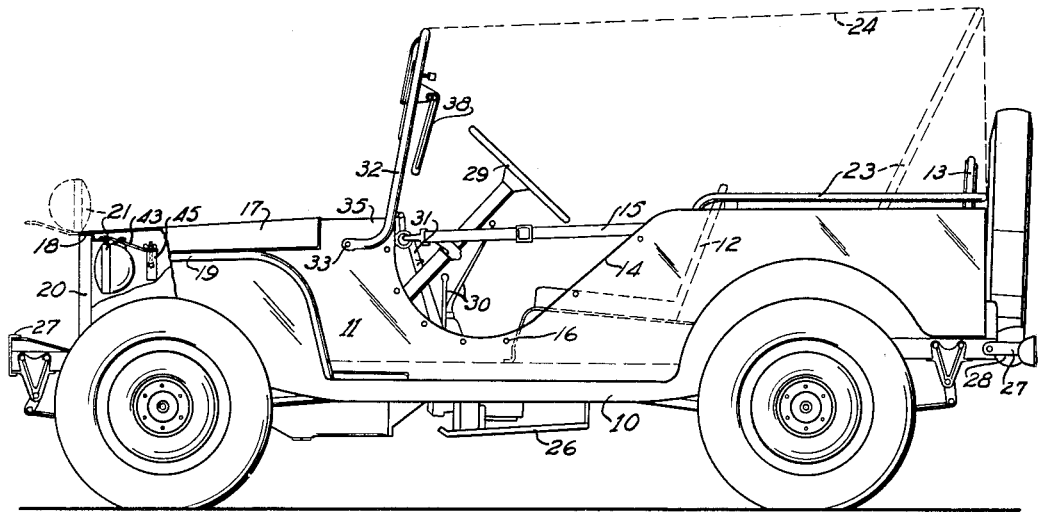
Figure 1 represents a side elevation of a motor vehicle.

Referring now to Figure 1, a motor vehicle of the type known as a reconnaissance car is shown which has a chassis 10 and a body 11. The body is equipped with a front seat 12 and a rear seat 13 and, instead of the customary doors, has the cutaway portion 14 and detachable safety straps 15. Snap fasteners 16 are placed above the opening 14 and a protective curtain is fastened therein.

Figure 2:
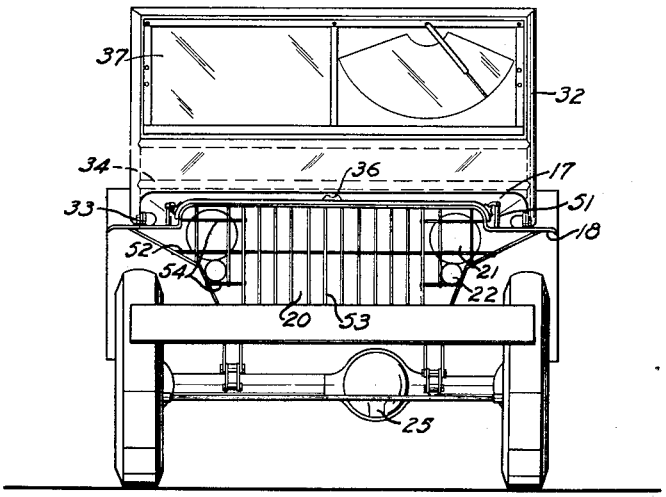
Figure 2 is a front elevation thereof.

Figure 2 shows that the hood portion 17, which is hinged at its rear edge to the body, is broad and flat and is held down against a continuous front bar 18 which extends across the front of the vehicle and also adds a support for the fenders 19 and is the upper member of the brush screen 20. Behind the brush screen and protected thereby are the head lamps 21 and the black-out lamps 22.

The rearward portion of the tonneau is surrounded by a removable handrail 23 which may be erected as shown by dotted line in Figure 1 to form a support for a top 24.

In the particular vehicle shown, a four-wheel drive is employed to make its use feasible over rough terrain, and a selective transmission and transfer case is used. The forward differential is shown at 25 and a skid to protect the running gear is shown at 26. Bumpers 27 are installed on the front and rear, the rear being made in two parts to permit the installation of a trailer hook 28. Also included are the usual steering wheel 29, the transfer and transmission controls 30 and the hand brake 31.

A windshield frame 32 is pivoted to the body at 33 and has a lower crossbar 34 which bears against the cowling 35 at a point rearwardly and above the pivot 33. This construction is such that the windshield frame may be folded down to rest on the hood 17, a cushion 36 being provided therefor at the front of the hood. The windshield glass proper 37 is hingedly secured at its upper edge in the windshield frame and may be opened as desired and maintained in place by the regulator 38.

Referring now to Figures 3 and 4, the construction of the head lamp mounting is shown. The head lamp 21, which includes the bowl portion 40 and the lens 41, is secured by an adjustable ball and socket joint 42 to the arm 43. This arm is hingedly secured at its forward end, as by hinge 44 to the front bar 18.

The bracket 45 is secured to the side panel of body 11 and has mounted therein a holddown bolt 46. This bolt is threaded at its upper end and has a wing nut 47 which is staked on the bolt as at 48. The rear end of the arm 43 is slotted as at 49 to engage the holddown bolt. A panel 50 extends partially around the lamp and from thence to the radiator core, which is not shown herein. The purpose of this panel is to prevent small bits of material from being forced through the brush screen and into the motor department.

In ordinary operation, the head lamp occupies the position shown in full line in Figure 1, that is, it is directed forwardly and the arm 43 engages the bracket 45. In this position the holddown bolt 46 is disposed in the slot 49 and the wing nut 47 is thus in engagement. However, when it is desired to change the light bulb or lens or when the head lamp is to be used as a trouble lamp in motor repairs, the lamp is shifted to the position shown in dotted lines in Figure 1. This is done by disengaging the wing nut and pivoting the holddown bolt out of engagement with the slot. The arm may then pivot about the hinge 44 and the entire lamp assembly is lifted out of its customary place under the hood and occupies the position shown. It will be understood, of course, that the hood 17 is hinged to the body at its rear edge and the entire hood may be rotated rearwardly to give access to the motor. A suitable holddown clamp 51 engages the hood in its lowered position and holds it rigidly against the front bar.

The brush screen 20, as noted previously, is formed of a plurality of spaced metal bars. These include the front bar 18 which serves as the top of the screen, an intermediate horizontal bar 52 and a number of vertical bars 53. Additional horizontal bars 54 are located near the lamps to permit an unobstructed space. These bars are welded or otherwise secured together at each intersection. At the junction of the verticals and the front bar, the vertical is cut down, leaving an extending lug 55 and a shoulder 56. The front bar has an aperture 57 shaped to receive the lug 55, while the shoulder 56 bears on the lower surface of the front bar. The bars are so assembled and welded, giving a strong screen construction without materially weakening the front bar.

It will be noted that by this arrangement the head lamp can be maintained rigidly in the operating position, but may be immediately removed when repairs or replacements are necessary and as quickly restored without need for refocusing. It is further apparent that the lamp, when in the raised position, is particularly adapted for a trouble lamp, and may be directed to illuminate any part of the motor compartment. When this arrangement is used, it will be noted that the lamp is protected fully from the front by the brush screen, and is enclosed within the body structure proper and protected from the sides and the rear as well. By means of the ball and socket joint shown, any necessary adjustment of the light range or direction may be readily made. This ball and socket joint is located at the top of the lamp and is easily accessible for such adjustment.

Some changes may be made in the arrangement, construction and combination of the various parts of my improved construction without departing from the spirit of my invention and it is my intention to cover by my claims such changes as may be reasonably included in the scope thereof.

I claim:

1. In a motor vehicle, in combination, a continuous front member, a hinged hood, the free ends thereof supported by the central portion of said front member, a protective guard secured to said front member, said guard comprising a plurality of spaced guard elements, an arm hinged at one end to said front member beneath said hood, the other end of said arm releasably engaging a supporting bracket, a lamp adjustably secured to said arm intermediate the ends thereof, said lamp being mounted below said arm and within the space defined by said hood and said protective guard.

2. In an automotive lamp construction, an engine compartment, a support at the forward end of said compartment, an arm hingedly secured to said support and extending rearwardly therefrom, a lamp adjustably secured to said arm therebeneath, and means releasably securing said arm at its rearward end to the enclosure of said motor compartment.

CLARENCE F. KRAMER.